United States Patent [19]

Mori et al.

[11] Patent Number: 4,893,690
[45] Date of Patent: Jan. 16, 1990

[54] FOUR-WHEEL STEER CONTROL SYSTEM

[75] Inventors: Kazunori Mori, Ebina; Fukashi Sugasawa, Yokohama; Kenji Kawagoe, Kaminokawa; Hiroshi Mori, Yokosuka, all of Japan

[73] Assignee: Nissan Motor Co., Ltd., Yokohama, Japan

[21] Appl. No.: 277,744

[22] Filed: Nov. 30, 1988

[30] Foreign Application Priority Data

Nov. 30, 1987 [JP] Japan .................. 62-299888
Feb. 12, 1988 [JP] Japan .................. 63-28858

[51] Int. Cl.$^4$ .............................................. B62D 5/06
[52] U.S. Cl. ...................................... 180/140; 180/142
[58] Field of Search ..................... 180/140, 142, 143; 280/91; 364/424.05

[56] References Cited

U.S. PATENT DOCUMENTS 4,690,431  9/1987  Ito et al. ........................ 180/140
4,718,685  1/1988  Kawabe et al. ................. 180/140

FOREIGN PATENT DOCUMENTS 60-161266  8/1985  Japan .

Primary Examiner—John A. Pekar
Attorney, Agent, or Firm—Foley & Lardner, Schwartz, Jeffery, Schwaab, Mack, Blumenthal & Evans

[57] ABSTRACT

A steering control system comprises means for performing a secondary steer of front and rear wheels by angles computed using a steer angle $\theta$, steer angle angular velocity $\dot{\theta}$ and vehicle speed V from the following formulas, $$\delta f = \frac{1}{N} \{Kf \cdot \theta + Tf \cdot \dot{\theta}\}$$

$$\delta r = \frac{1}{N} \{Kr \cdot \theta + Tr \cdot \dot{\theta}\}$$

where $\delta f$ is a front wheel secondary steer angle, $\delta r$ is a rear wheel secondary steer angle, N is a steer gear ratio and Kf, Kr, Tf and Tr are control constants which are functions of vehicle speed.

In accordance with the present invention, the control system is provided with means for correcting the control constants Kf and Kr in such a way that the control constants Kf and Kr become a steady-state value when the steer angle is larger than a predetermined value and become smaller than the steady-state value when the steering angle becomes smaller than the predetermined value, means for correcting the control constants Tf and Tr in such a way that the control constants Tf and Tr become a steady-state value when the steer angle is larger than a predetermined value and become smaller than the second mentioned steady-state value when the steer angle becomes smaller than the second mentioned predetermined value, means for correcting the control constants Kf and Kr in such a way that the control constant Kr reduces at the rate larger than the control constant Kf as the steer angle reduces from the first mentioned predetermined value, and means for correcting the control constants Tf and Tr in such a way that the control constant Tf reeduces at the rate larger than the control contant Tr as the steer angle reduces from the second mentioned predetermined value.

5 Claims, 2 Drawing Sheets

FOUR-WHEEL STEER CONTROL SYSTEM

BACKGROUND OF THE INVENTION I. Field of the Invention

The present invention relates to a four-wheel steer control system for a wheeled vehicle for improving a vehicle driving stability such as a straightahead running stability. II. Description of the Prior Art A prior art steering control system of this kind is disclosed in the Japanese Provisional Patent Publication No. 60-161266 assigned to the same assignee of this application.

In the prior art steering control system, the control constants Kf, Kr, Tf and Tr are set to be constant irrespective of the steer angle $\theta$. Due to this, when the steering wheel is slightly steered during straightahead running of the vehicle, a quick, sharp movement like a jerk of the vehicle results. This movement gives the driver a strange feel which does not occur in the two-wheel steer vehicle and therefore causes an uncomfort and unease of the driver.

SUMMARY OF THE INVENTION

In accordance with the present invention, there is provided an improved steering control system for a wheeled vehicle having a set of steerable front wheels, a set of steerable rear wheels, a steering wheel and a steering gear.

The system comprises means for performing a main steer of the front wheels by an angle determined by the steering gear in response to a steering operation of the steering wheel, and means for performing, in addition to the above described main steer, a secondary steer of the front and rear wheels in response to the steering operation of the steering wheel by angles computed using a steer angle $\theta$, steer angle angular velocity $\dot{\theta}$ and vehicle speed V from the following formulas, $$\delta f = \frac{1}{N} \{Kf \cdot \theta + Tf \cdot \dot{\theta}\}$$
$$\delta r = \frac{1}{N} \{Kr \cdot \theta + Tr \cdot \dot{\theta}\}$$

where $\delta f$ is a front wheel secondary steer angle, $\delta r$ is a rear wheel secondary steer angle, N is a steering gear ratio and Kf, Kr, Tf and Tr are control constants which are functions of vehicle speed. The foregoing structure may substantially follow the conventional fashion.

In accordance with the present invention, the steering control system is further provided with means for correcting the control constants Kf and Kr in such a way that the control constants Kf and Kr become a steady-state value when the steer angle is larger than a predetermined value and become smaller than the steady-state value when the steering angle becomes smaller than the above described predetermined value, means for correcting the control constants Tf and Tr in such a way that the control constants Tf and Tr become a steady-state value when the steer angle is larger than a predetermined value and become smaller than the second mentioned steady-state value when the steering angle becomes smaller than the second mentioned predetermined value, means for correcting the control constants Kf and Kr in such a way that the control constant Kr reduces at the rate larger than the control constant Kf as the steer angle reduces from the first mentioned predetermined value, and means for correcting the control constants Tf and Tr in such a way that the control constant Tf reduces at the rate larger than the control contant Tr as the steering angle reduced from the second mentioned predetermined value.

The above structure is effective for overcoming the above noted problems inherent in the prior art device.

It is accordingly an object of the present invention to provide an improved four-wheel steer control system which can prevent or at least make smaller an unnatural movement, i.e., a quick, sharp movement of the vehicle caused by a slight movement of the steering wheel adjacent its neutral position.

It is a further object of the present invention to provide an improved four-wheel steer control system of the above described character which can prevent the inconformity between the steering wheel operation and the resulting vehicle movement, particularly when the steering wheel is adjacent its neutral position.

It is a further object of the present invention to provide an improved four-wheel steer control system of the above described character which can reduce the design restrictions in tuning of the secondary steer angles of the front and rear wheels.

It is a further object of the present invention to provide an improved four-wheel steer control system of the above described character which can improve the driving stability of the vehicle.

It is a further object of the present invention to provide an improved four-wheel steer control system of the above described character which does not give the above noted uncomfort and unease to the driver.

It is a further object of the present invention to provide an improved four-wheel steer control system which can improve the driving stability of the vehicle.

DESCRIPTION OF THE PREFERRED EMBODIMENTS

Figure 1:
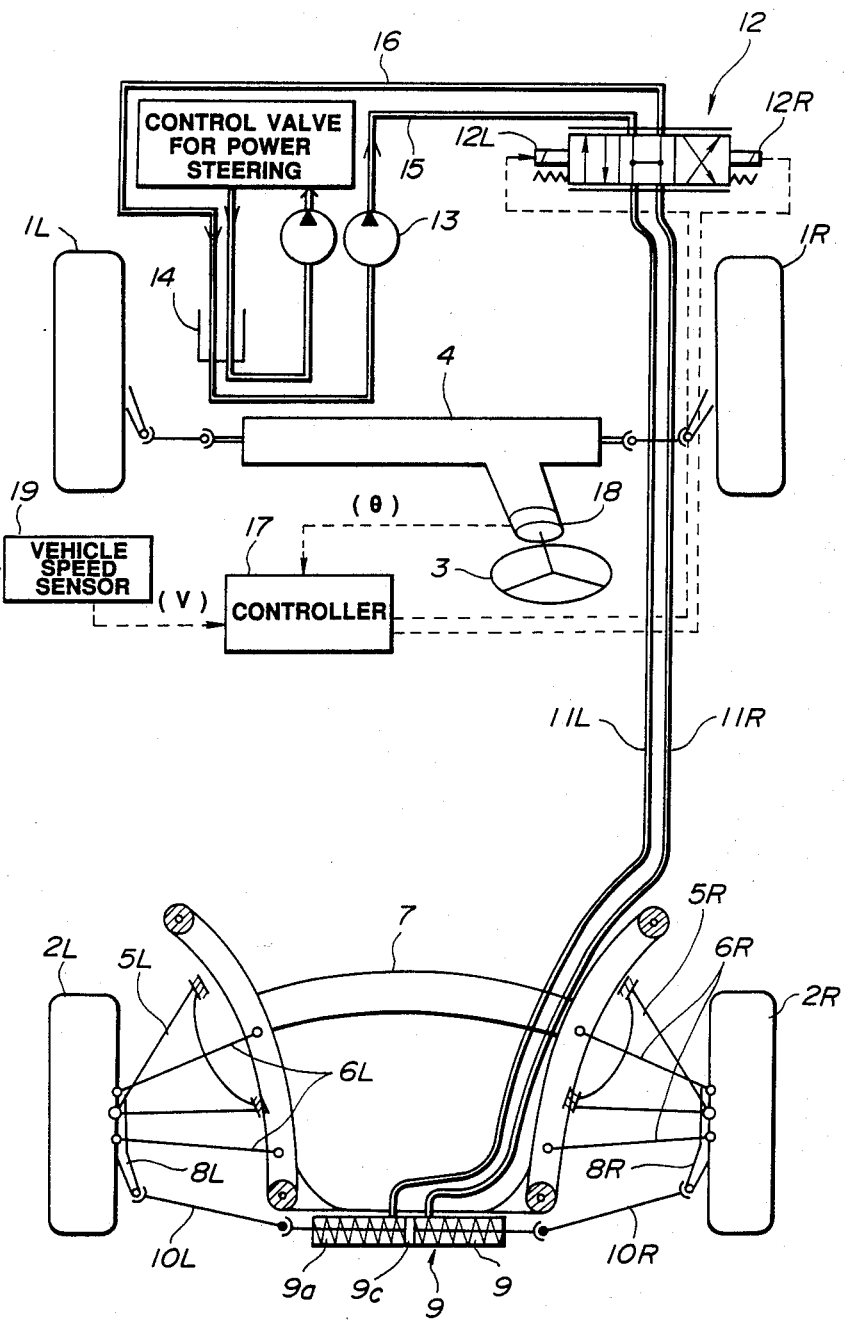
FIG. 1 is a schematic view of a four-wheel steer control system according to an embodiment of the present invention.
Figure 2:
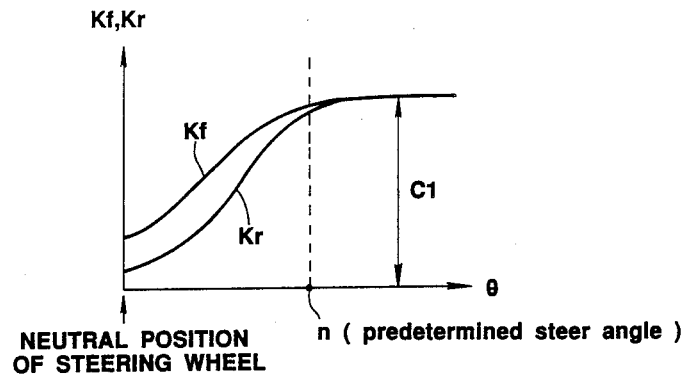
FIG. 2 is a graph depicting a relation between a steer angle $\theta$ and control constants Kf and Kr used in the control system of FIG. 1.
Figure 3:
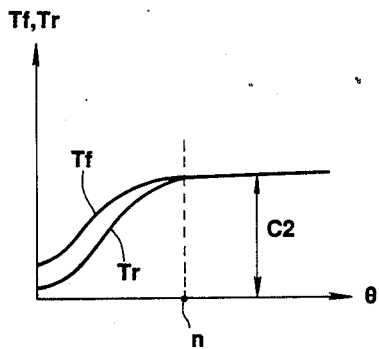
FIG. 3 is a graph depicting a relation between a steer angle $\theta$ and control constants Tf and Tr used in the control system of FIG. 1.

A four-wheel steer control system according to an embodiment of the present invention is shown in FIGS. 1 to 3 in which indicated by the reference numerals 1L and 1R are front wheels and by 2L and 2R are rear wheels. The front wheels 1L and 1R are steerable by means of a steering wheel 3 through a steering gear 4. The rear wheels 2L and 2R are suspended upon a vehicle body rear suspension member 7 and steerable by means of a rear suspension device including transverse links 5L and 5R and upper arms 6L and 6R. To this end, knuckle arms 8L and 8R are interconnected by an actuator 9 and side rods 10L and 10R at the opposite ends of the actuator 9.

The actuator 9 is a double acting cylinder of the spring centered type, and its two chambers 9a and 9b on the opposite side of a piston 9c are respectively connected through conduits 11L and 11R to a pressure control valve 12 of the electromagnetically proportional type. The control valve 12 is connected with a hydraulic pressure conduit 15 of a hydraulic pressure source consisting of a hydraulic pump 13 and a reservoir 14 and further with a drain conduit 16. The control valve 12 is a spring centered, three position valve and is operative so as to supply no hydraulic pressure to the conduits 11L and 11R when solenoids 12L and 12R are OFF and supply to the conduit 11L a hydraulic pressure proportional to the amount of current supplied to the solenoids 12L and 12R when the solenoids 12L and 12R are ON.

ON and OFF of the solenoids 12L and 12R and the amount of current supplied thereto are electronically controlled by a controller 17. That is, the controller 17 is adapted to receive a signal from a steer angle sensor 18 for sensing a steer angle $\theta$ of the steering wheel 3 and a signal from a vehicle speed sensor 19 for sensing a vehicle speed V to perform an arithmetic operation and supplies a signal to the control valve 12 so that the actuator 9 is actuated by the control valve 12 to steer the rear wheels 2L and 2R.

The four-wheel steer control system is adapted to secondarily steer the front and rear wheels by the angles computed using the steer angle $\theta$, steer angle angular velocity $\dot{\theta}$ and vehicle speed V from the following formulas, $$\delta f = \frac{1}{N}\{Kf \cdot \theta + Tf \cdot \dot{\theta}\}$$
$$\delta r = \frac{1}{N}\{Kr \cdot \theta - Tr \cdot \dot{\theta}\}$$

where $\delta f$ is a front wheel secondary steer angle, $\delta r$ is a rear wheel secondary steer angle, N is a steering gear ratio and Kf, Kr, Tf and Tr are control constants which are functions of vehicle speed.

In accordance with the present invention, the control constants Kf and Kr are set so as to be smaller than a steady-state value C1 for a large steer angle $\theta$ as shown in FIG. 2 when the steer angle is nearly zero, i.e., when the steering wheel 3 is adjacent its neutral position whilst at the same time the control constants Tf and Tr are set so as to be smaller than a steady-state value C2 for a large steer angle $\theta$ as shown in FIG. 3 when the steer angle is nearly zero.

Further, the rear wheel control constants Kr and Tr are adapted to decrease at the rate larger than the front wheel control constants Kf and Tf as seen from FIGS. 2 and 3.

When the gains of Kf, Kr, Tf and Tr are set so as to be small under $\theta \doteq 0$, the secondary steer angles $\delta f$ and $\delta r$ in response to a small change in the steer angle of the steering wheel 3 becomes small, thus making it possible to prevent quick, sharp turns of the front and rear wheels 1L, 1R, 2L and 2R and therefore the otherwise occuring unnatural vehicle movement. Further, when the steer angle $\theta$ becomes large, the secondary steer angles $\delta f$ and $\delta r$ become to be predetermined values, thus making it possible to prevent the inconformity between the steering wheel operation and the resulting vehicle movement when the steering wheel 3 is adjacent its netural position, i.e., adjacent a straightahead running position, without affecting the general driving stability.

In the foregoing, it is to be noted that the front wheels 1L and 1R are adapted to perform a main steer by an angle determined by the gear ratio of the steering gear 4 in response to an operation of the steering wheel 3. The above described secondary steer of the front and rear wheels 1L, 1R, 2L and 2R are performed in addition to the above described main steer in order to improve the driving stability of the vehicle.

Figure 4:
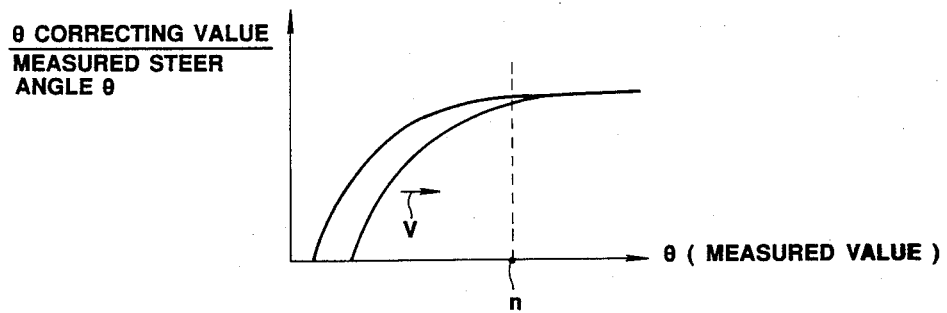
FIG. 4 is a graph depicting a relation between a measured steer angle $\theta$ and a ratio of a $\theta$ correcting value to a measured steer angle $\theta$.

FIG. 4 shows another embodiment of the present invention in which correction is made, in addition to the above described control constants Kf, Kr, Tf and Tr, to the measured steer angle $\theta$ so as to use the $\theta$ correcting value when calculating the front and rear wheel secondary steer angles $\delta f$ and $\delta r$, whereby to prevent the above described inconformity more assuredly.

That is, as shown in FIG. 4, the ratio of the $\theta$ correcting value to the measured steer angle $\theta$ is set so as to be small when the steering wheel 3 is adjacent its neutral position, as shown in FIG. 4.

When the ratio is set so as to vary depending upon variation of vehicle speed V, a good result is obtained at the overall vehicle speed. For example, the ratio may be set so as to decrease with increase of vehicle speed V as shown in FIG. 4 because as the vehicle speed V increases the necessitated steer angle $\theta$ reduces, i.e., the vehicle responds to the steering wheel operation with an increasing sharpness, thus requiring to make the front and rear secondary steer angles $\delta f$ and $\delta r$ smaller.

From the foregoing, it will be understood that since the gains of Kf, Kr, Tf and Tr are set so as to be small when $\theta \doteq 0$, the secondary steer angles $\delta f$ and $\delta r$ in response to a small change in the steer angle of the steering wheel 3 becomes small, thus making it possible to prevent an otherwise ocurring quick, sharp turn of the front and rear wheels and therefore an unnatural vehicle movement.

It will be further understood that when the steer angle $\theta$ becomes large, the secondary steer angles $\delta f$ and $\delta r$ become to be predetermined values, thus making it possible to prevent the inconformity between the steering wheel operation and the resulting vehicle movement when the steering wheel is adjacent its neutral position.

It will be further understood that correction made to the steer angle $\theta$ when $\theta$ is small is effective for reducing the above described inconformity and for reducing the design restrictions in the tuning of the secondary steer angles $\delta f$ and $\delta r$.

What is claimed is:

1. A steering control system for a wheeled vehicle having a set of steerable front wheels, a set of steerable rear wheels, a steering wheel and a steering gear, comprising:

means for performing a main steer of said front wheels by an angle determined by said steering gear in response to a steering operation of said steering wheel;

means for performing, in addition to said main steer, a secondary steer of said front and rear wheels in response to said steering operation of said steering wheel by angles computed using a steer angle steer angle angular velocity $\dot{\theta}$ and vehicle speed V from the following formulas, $$\delta f = \frac{1}{N}\{Kf \cdot \theta + Tf \cdot \dot{\theta}\}$$
$$\delta r = \frac{1}{N}\{Kr \cdot \theta + Tr \cdot \dot{\theta}\}$$

where δf is a front wheel secondary steer angle, δr is a rear wheel secondary steer angle, N is a steering gear ratio and Kf, Kr, Tf and Tr are control constants which are functions of vehicle speed;

means for correcting said control constants Kf and Kr in such a way that said control constants Kf and Kr become a steady-state value when said steer angle is larger than a predetermined value and become smaller than said steady-state value when said steering angle becomes smaller than said predetermined value;

means for correcting said control constants Tf and Tr in such a way that said control constants Tf and Tr become a steady-state value when said steer angle is larger than a predetermined value and become smaller than said second mentioned steady-state value when said steer angle becomes smaller than said second mentioned predetermined value;

means for correcting said control constants Kf and Kr in such a way that said control constant Kr reduces at the rate larger than said control constant Kf as said steer angle reduces from said first mentioned predetermined value; and means for correcting said control constants Tf and Tr in such a way that said control constant Tf reduces at the rate larger than said control contant Tr as said steer angle reduces from said second mentioned predetermined value.

2. A steering control system as set forth in claim 1, further comprising means for correcting a steering angle in such a way that a ratio of a $\theta$ correcting value to a measured steer angle $\theta$ is relatively small when said steering wheel is adjacent its neutral position and varies depending upon variation of said vehicle speed.

3. A steering control system as set forth in claim 2 wherein said ratio of said $\theta$ correcting value to said measured steer angle $\theta$ increases with increase of said vehicle speed and at the rate that reduces with increase of said vehicle speed.

4. A steering control system as set forth in claim 1 wherein said control constants Kf and Kr reduce as said steer angle reduces from said first mentioned predetermined value to zero.

5. A steering control system as set forth in claim 1 wherein said control constants Tf and Tr reduce as said steer angle reduces from said second mentioned predetermined value to zero.

* * * * *